May 12, 1959

J. C. RABIER 2,886,761

REGULATED HIGH VOLTAGE POWER SUPPLY

Filed March 13, 1956

INVENTOR.
JEAN C. RABIER
BY
George S. Hastings
ATTORNEY.

United States Patent Office 2,886,761
Patented May 12, 1959

2,886,761

REGULATED HIGH VOLTAGE POWER SUPPLY

Jean C. Rabier, Pomona, Calif., assignor, by mesne assignments, to Marquardt Aircraft Co., Van Nuys, Calif., a corporation of California Application March 13, 1956, Serial No. 571,234

10 Claims. (Cl. 321—19)

This invention relates to a regulated high direct current voltage power supply which is capable of furnishing a large variety of regulated direct current voltages. More particularly the invention relates to that type of high voltage direct current power supply which would be suitable for testing such tubes as magnetrons or backward wave oscillators or carcinatrons.

Since the frequency of magnetrons and carcinatrons is a function of the cathode-anode voltage, it is a matter of great importance that the power supplies of the above type have high stability of voltage. In the prior art systems of this type, the output voltage adjustment and regulation is obtained by connecting a thermionic tube in series with the load and then controlling the cathode-to-plate resistance of this tube by the auxiliary control circuits connected to the control grid of the tube. The control circuits impress an amplified error voltage on this grid. The error voltage is obtained by comparing the output voltage of the power supply with a stable reference voltage and also by impressing any transient changes in the output voltage on the same grid. Two control channels are used for obtaining the desired control. The first channel is called the low frequency control channel because it is designed to amplify voltage variations between 0 and 5–6 per second.

The second channel is called the high frequency control channel because it is designed to amplify all voltage variations having a frequency between 6 and 50,000 cycles per second. Some power supplies have the outputs of the first and second control channels connected to a third amplifier where the direct and the alternating components are mixed, amplified, and then impressed on the grid of the series tube for regulating its resistance so as to maintain the load voltage constant. Usually these two control channels require several voltages for their proper functioning. In the prior art these voltages are usually obtained from the full, high output voltage of the power supply which requires the use of high power amplifier tubes capable of withstanding the full high voltage of the power supply and also capable of dissipating large amounts of heat. Accordingly, the known power supplies use high power tubes in all control channels and they also use a high power tube for the series tube which is connected in series with the load and is also connected in series with at least one high power control tube. In view of the above, the known power supplies have low efficiencies, such as 10%. Such low efficiencies increase the cost, size, weight, power dissipation and electronic packaging problems of such power supplies. Moreover, the voltage stability of such power supplies depends on the stability of the output voltage itself because the full high output voltage is used as a voltage supply for all the control and amplifier channels.

According to the invention, two independent power supplies are used for energizing the two control channels and, what is most important the two channels are electrically isolated from each other so that only small voltages ever appear across the component elements in the two channels. The above method of isolating the two channels and their power supplies from each other makes it possible to use low wattage tubes in all channels and a low wattage series tube because none of the above tubes are connected across the full high output voltage. The following advantages follow from what is disclosed by this invention: much high overall efficiency; the use of low power tubes throughout the power supply, including the main series tube, which is also a low power tube; independence of the control channels, insofar as their operating voltages are concerned, of the full bus-bar, or load, voltage with the concomitant better control of the main bus-bar voltage by the control channels; lower cost; smaller size and lower weight of the power supply. Current efficiencies in the order of 50 or 60% are possible and the wattage efficiency may be of the order of 80%. The latter efficiency may be obtained, for example, by using 5 watts for operating the control system and 20 watts for the load.

It is, therefore, an object of this invention to provide a regulated high voltage power supply having high output voltage stability by utilizing isolated low frequency and high frequency control channels for controlling the resistance of a series tube.

It is an additional object of this invention to provide a regulated high voltage power supply having a large range of output voltage adjustments which is obtained by introducing an auto-transformer on the input side of the supply and by utilizing electrically isolated control channels for a thermionic tube which is connected in series with the load.

Still another object of this invention is to provide a regulated high voltage power supply of the above type which permits the use of the low wattage type tubes in the amplifiers used for obtaining proper control of the output voltage, and a low wattage series tube.

Still another object of this invention is to provide a regulated high voltage power supply of the aforementioned type having markedly improved current and power efficiencies, lower cost, lower weight, more favorable heat dissipation because of the markedly higher efficiencies and the use of the lower wattage tubes throughout the circuits of the power supply.

The novel features which are believed to be characteristic of the invention, both as to its organization and method of operation, together with the further object and advantages thereof, will be better understood from the following description taken in connection with the accompanying drawings in which the single embodiment of the invention is illustrated here as an example of the invention. It is to be expressly understood, however, that the drawings are for the purpose of illustration and description only and are not intended as a definition of the elements of the invention. Referring to the drawings:

Figure 1:
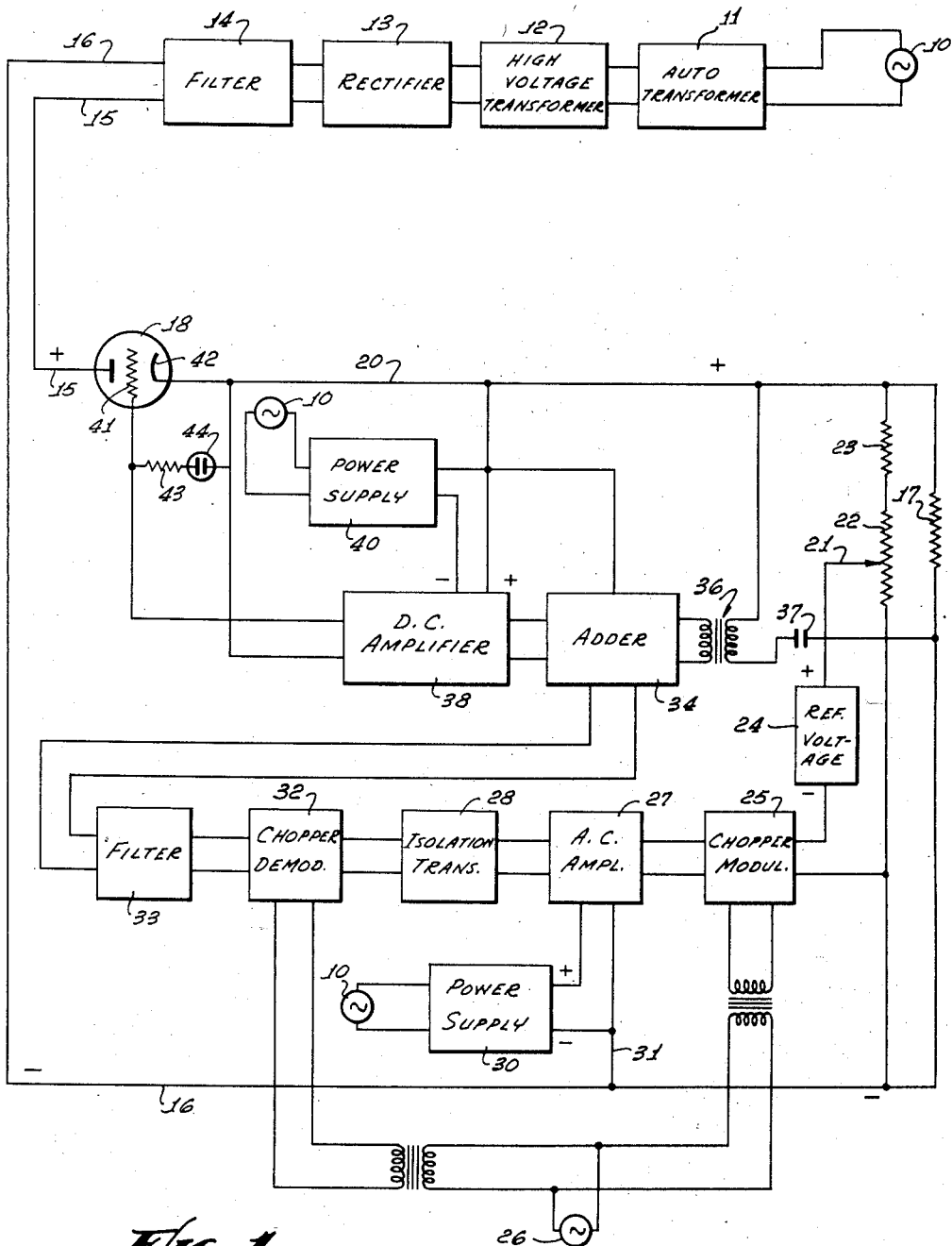
Fig. 1 is a block diagram of the high voltage power supply.

Referring to the drawings, and particularly to Fig. 1, it illustrates the control system for a single phase source of power 10 which is impressed on an auto-transformer 11. It is to be understood that whenever a 3-phase source of power is used, then it is reduced to a single phase in appropriate rectifiers and transformers which are known in the art and need not be described here. The ratio arm 200, Fig. 2, of the auto-transformer is set at that position which produces the desired voltage across the voltage regulator system. The auto-transformer arm 200 is mechanically coupled to the potentiometer arm 21 by means of a mechanical linkage 203, which will be described more in detail later on in connection with the description of Fig. 2. The introduction of the auto-transformer 11 permits the first and the main reduction of the voltage impressed on the control system whenever such reduction is necessary. Therefore, the remaining components of the power supply may be low wattage components as compared to the components in the known power supplies. The output of the auto-transformer is impressed on the primary of either a step-up or a step-down transformer 12. Transformer 12 is a step-up transformer when the power supply 10 has relative low voltage as compared to that desired across the load. For example, when source 10 is 110 or 220 volt source and it is desired to obtain 10,000 volts across a load 17, then transformer 12 is a step-up transformer. It is a step-down transformer (for a 50 to 1 range) when very low direct current across load 17 is desired. The output of transformer 12 is connected to a rectifier 13 and a filter 14, the rectifier 13 being connected so that a conductor 15 is positive with respect to conductor 16. Conductor 15 is connected directly to one side of load 17 through a series tube 18, the plate of which is connected to conductor 15, while its cathode is connected to a conductor 20. Conductor 20 is connected to the other side of load 17. The series tube 18 is connected in series with load 17 and acts as a variable impedance connected in series with the load to maintain the load voltage constant once it is adjusted to the desired value, even though there may be a variation in the impedance of load 17 or a variation in the voltage supplied by source 10.

There are two separate control channels which control the impedance of tube 18. One channel is the slow voltage, or low frequency, variations channel, or the direct current components channel, and the other is transients, or the high frequency channel to control the ripple and the transients which may appear across the conductors 20 and 16. Conductors 20 and 16 may be called as the bus-bars in this voltage supply system.

The low frequency control channel begins with a voltage divider including a potentiometer 22 having a potentiometer arm 21 and a fixed resistor 23. The resistors 23 and 22 are connected across conductors 20 and 16 and, therefore, the voltage that appears across load 17 also appears across resistors 23 and 22. The potentiometer arm 21 on one side is slideably connected to resistor 22, while on the other side it is connected to a standard cell or a reference voltage 24 which acts as a reference voltage for the direct current control channel. The positive terminal of the cell is connected to the potentiometer arm 21 while the negative terminal of the cell is connected to a chopper-modulator 25. The chopper-modulator 25 has its armature actuated by means of a coil connected to a source of alternating current 26. The output circuit of the chopper-modulator is connected to an alternating current amplifier 27. The dotted line 203, Fig. 2, indicates that the potentiometer arm 21 and arm 200 of the auto-transformer are mechanically linked together so that the settings of the arms 21 and 200 are changed simultaneously. The potentiometer 22 is a precision potentiometer and is calibrated in volts and fractions of a volt. When arm 21 is set against some scale reading, the voltage equal to this reading appears across the bus-bar conductors 20 and 16. The setting of the transformer arm 200 need not be precise because the control circuits will adjust the bus bar voltage to that appearing on the scale of the potentiometer arm 21. The output of the alternating current amplifier is impressed on the isolation transformer 28. It is to be noted that the alternating current amplifier 27 is energized from an independent source of power supply 30, which is connected to the source of alternating current 10. Since the negative terminal of the power source 30 is connected to conductor 16 over a conductor 31, it becomes necessary to use an isolation transformer 28 so as to prevent the full bus bar voltage, appearing across the conductors 20 and 16 from being impressed on amplifier 27. The output of the isolation transformer 28 is impressed on the chopper-demodulator 32, then a filter 33, and then on an adder 34. Adder 34 is also connected across load 17 or bus bars 20—16 through an input transformer 36 and a condenser 37; transformer 36 impresses all fast voltage variations, or high frequencies, on adder 34 while filter 33 impresses all slow voltage variations on the same adder. The resultant combined signal is impressed on a direct current amplifier 38. The output of the direct current amplifier is impressed on the control grid 41 of the series triode 18. Grid 41 is connected to cathode 42 through a grid resistor 43 and a gas filled tube 44. Adder 34 and amplifier 38 have their own power supply 40 which is isolated from power supply 30 by means of isolating transformer 28, Fig. 2; therefore, adder 34 and amplifier 38 are isolated from the low frequency channel which includes chopper 25, alternating current amplifier 27, isolating transformer 28, chopper 32 and filter 33. The latter channel is the previously mentioned direct current channel which receives slow voltage variations, appearing across the bus bar conductors 20—16, at the input into chopper-modulator 25. Here the slow voltage variations are converted into a series of pulses which are impressed on the alternating current amplifier 27. The chopper-modulator 32 is synchronized with the chopper-modulator 25 because both of these choppers are connected to the same source of alternating current potential 26. The rectangular waves appearing in the output of the chopper-demodulator 32 are filtered on filter 33, and, therefore, appear once more as slow voltage variations impressed on the adder 34 where they are combined with the fast voltage variations impressed on the same adder by transformer 36.

Examination of Figure 1 discloses that the low frequency and the high frequency control channels have their own independent power supplies 30 and 40, which are isolated from each other by means of isolation transformer 28; therefore, neither of these channels is subjected to the full high voltage appearing across the bus bar conductors 20—16. Such mode of operation of the control channels enables one to use low wattage tubes in both channels which contributes materially to the high efficiency of the power supply. As will appear more fully from the description of the schematic diagram of the power supply, the stability of the voltage, appearing across the bus bar 20—16, is also improved because of the use of the independent power supplies for the control channels. The operation of the control channels is thus made independent of the voltage variation on the bus bar.

Figure 2:
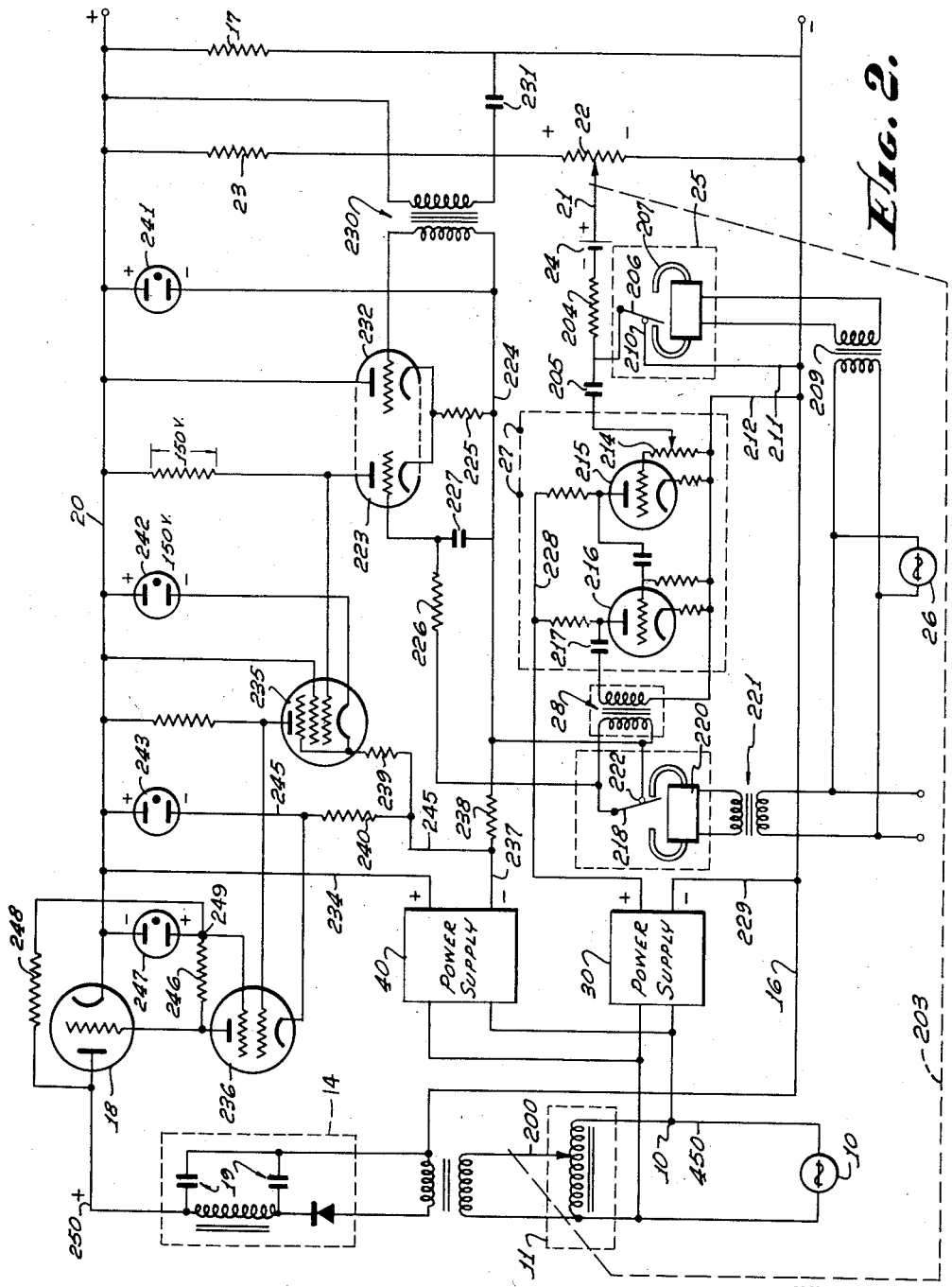
Fig. 2 is schematic diagram of the high voltage power supply.

Referring now to the schematic diagram of the high voltage regulator power supply illustrated in Figure 2, and beginning the description with the low frequency channel, the potentiometer arm 21 is connected to the positive terminal of reference voltage 24, which may be a standard cell; the negative terminal of this cell is connected to a resistor 204 which is connected to a coupling condenser 205 and to an armature 206 of a chopper-modulator 25; the chopper-modulator 25 comprises a polarized relay 207, the winding of which is connected to a source of alternating current 26 through a transformer 209. Contact 210 of relay 207 is connected to a conductor 211 which is connected to the negative bus bar 16. Therefore, when the armature 206 makes contact with contact 210, condenser 205 is discharged through a conductor 212 and a potentiometer resistor 214 which is connected to the grid of a triode 215. Since potentiometer 22 is connected across the bus bar conductors 20 and 16, a full bus bar, or load, voltage appears across this potentiometer. The setting of the potentiometer arm 21 is adjusted to produce a voltage on the potentiometer arm 21 equal to and opposite to the voltage produced by the reference voltage 24 as long as the bus bar voltage is equal to the desired voltage across load 17; any slow voltage variations which take place thereafter will appear as positive or negative rectangular voltage waves on the grid of triode 215. It should be noted that the transient and ripple signals are also transmitted to the grid of triode 215 as long as armature 206 is not shorting condenser 205 and the input circuit of triode 215. However, since the frequency of vibration of armature 206 is relatively low, it is impossible to rely on this control circuit for responding faithfully to the high frequency signals. It is for this reason that this control channel is referred to as the "direct current" control channel. A more accurate term would be a control channel which is faithfully responsive to all slow voltage changes which can get through, without modification of the desired effect on the control of this channel, the chopper 25. The choppers are used in order to avoid the use of a direct current amplifier which inherently is too unstable for this use (unless stabilized through known complex means).

The output of triode 215 is capacitively coupled to a triode 216; the cathodes of the triodes 215 and 216 are connected to the negative bus 16 while their plates are connected through plate resistors to power supply 30. The output of triode 216 is capacitively coupled through a condenser 217 to the isolating transformer 28; the secondary winding of this transformer is connected to the armature 218 of a polarized relay 220 whose winding is connected through a transformer 221 to the source of alternating current 26. The polarized relay 220, with its armature 218, corresponds to the chopper-demodulator 32 illustrated in Figure 1. When relay 220 connects armature 218 to its contact 222, the output of amplifier 27, which includes two triodes 215 and 216, is shorted; when armature 218 leaves contact 222 the output of amplifier 27 is impressed on the control grid of a triode 223, the cathode of which is connected to a conductor 224 through a cathode resistor 225. A filter is connected in the grid-to-cathode circuit of triode 223; this filter includes a resistor 226 and a condenser 227 which integrate the rectangular waves impressed on the filter by the chopper-demodulator 32, with the result that a variable direct current is impressed on the grid of triode 223. This variable direct current voltage corresponds to the slow voltage variations appearing across load 17.

It is to be noted that the chopper-modulator 25, and the chopper-demodulator 32, are synchronized because both of them are connected to the same source 26 of alternating current potential. These two choppers must be synchronized to obtain a clamping effect, and to obtain zero signal on triodes 215 and 223 at the same time; such synchronization of the two choppers produces a proper direct current voltage on the grid of triode 223 which is a mixer tube receiving the slow and the fast voltage variations.

The low frequency control channel is connected to the independent power supply 30 which supplies the necessary operating potentials to the alternating current amplifier 27 over conductors 228 and 229, conductor 229 being connected to the negative bus 16 which acts as "ground" for the alternating current amplifier.

It should be noted here that no high potential appears across any part of this low frequency channel, the potential of the power supply 30 being adjusted to that value which is necessary for operating triodes 215 and 216. This is made possible by introducing an isolation transformer 28, the secondary of which is connected through various tubes of the alternating control channel and power supply 40 to the positive bus 20. The primary winding of transformer 28 is directly connected over conductor 212 to the negative bus 16; therefore, the isolation transformer 28 must be of the type to withstand the high voltage appearing between the busses 20 and 16 and its primary and the secondary windings; by using a separate power supply 30 and transformer 28, it is possible for the tubes 214 and 216 to be low wattage tubes.

Proceeding now with the description of the high frequency control channel, its input circuit is connected across bus wires 20—16 by the primary of a transformer 230 and a condenser 231, the secondary of which is connected on one side to the grid of a triode 232, while the other side of the same secondary is connected to the cathode resistor 225; the plate of triode 232 is connected directly to bus 20. Power supply 40 for the alternating current channel is connected to bus 20 by a conductor 234 and to the cathode of the direct current amplifier, including triodes 232 and 223 and pentodes 235 and 236, through a conductor 237 and a plurality of resistors 238, 239 and 240, which are current limiting resistors connected in series with the respective gas-filled tubes 241, 242 and 243. These gas-filled tubes act as the voltage stabilizing means for the cathode-anode voltages impressed on the triodes 223, 232, and pentodes 235 and 236. Tube 241 is connected between a conductor 224 and bus 20; tube 242 is connected between the cathode of pentode 235 and bus 20; and tube 243 is connected between the cathode of tetrode 236 and bus 20. All fast voltage variations appear across the cathode resistor 225 and the cathode-anode circuit of triode 232. These voltage variations are combined in triode 223 with the slow voltage variations since the cathode resistor 225 is common to both triodes. The plate of triode 223 is directly connected to the control grid of pentode 235, where all voltage variations are amplified and then impressed on the control grid of tetrode 236, where they are amplified still further. The plate of tetrode 236 is connected directly to the grid of the series triode 18 and to a plate resistor 246 and to the positive bus 20 through a gas-filled tube 247. The junction point 249 is connected through a resistor 248 to a conductor 250, which is connected to the output of filter 14; therefore, a regulated power supply of tetrode 236 is provided by source 40 and the voltage regulation is provided by the gas-filled tubes 247 and 243. The gas-filled tube 243 is energized by the power supply 40 through the conductor 234 and resistance 240. The gas-filled tube 247 is energized by the voltage drop triode 18; resistance 248 is used to protect tube 247 from carrying an excessive current and for obtaining stable operation of tube 247. It is also necessary to connect the plate of tetrode 236 to conductor 250 in order to obtain high voltage on the plate of this tetrode since the voltage drop obtained across the gas-filled tube 243 is rather low. This is the case because it becomes necessary to adjust the voltage drops across the gas-filled tubes 241, 242 and 243, and the magnitude of the resistances 238, 239 and 240 so that it would be possible to obtain proper grid-to-cathode voltages in all the tubes of the direct current amplifier. Therefore, while in one specific example the voltage drop across the gas-filled tube 241 is in the order of 250 volts, the voltage drop across the gas-filled tube 243 is only in the order of 100 volts. If it is desired to have the cathode-to-plate voltage in tetrode 236 equal to 200 volts, the additional voltage of 100 volts can be obtained by connecting the plate of tetrode 236 to conductor 250 in the manner indicated in the figure. The voltage drop across the plate resistor 246 is adjusted to obtain a proper bias for the series triode 18. Tetrode 236, accordingly, obtains its cathode-anode voltage from tubes 247 and 243 connected in series.

The potential on all of the direct current amplifier tubes, including tubes 232, 223, 235 and 236, and especially their cathode-to-grid potentials, are adjusted so that all of these tubes operate as class "A" amplifiers to avoid any distortion of signals. These potentials are supplied by the power supply 40 which is connected to conductor 237 on the minus side and to bus 20 on the position side. This power supply is isolated from bus 16 by the isolating transformer 28 and, therefore, the only potentials that are impressed on the tubes of the direct current amplifier are those produced by the power supply 40, after the terminal potential of source 40 is reduced to some appropriate lower voltages by the gas-filled tubes and the serially connected resistors in the manner described previously. Therefore, all of the direct current amplifier tubes are low wattage tubes, which is also true of the tubes used in the alternating current amplifier 27.

This mode of operation of the direct current amplifier materially contributes to the efficiency of the entire high voltage regulated power supply because there is no need of dissipating large amounts of power in these tubes. In the prior art, these tubes are connected between the main bus bars 20—16 and, therefore, require large power dissipation.

The regulation of the voltage appearing across load 17 is also improved by providing independent power supplies for the two control channels since the operation of these two channels is now made independent of any voltage variations that may appear on the main bus bars 20—16.

The description of the power supply circuits also includes the main operating features of the circuits; therefore, only a brief summary of its functioning will be given here; alternating current potential appearing in the output of source 10 is converted into direct current potential with the aid of auto-transformer 11, step up or step down transformer 12, rectifier 13, and filter 14. This potential is impressed on the bus bars 16 and 20 and load 17. Triode 18 is connected in series with the load and the resistance of triode 18 is controlled by means of the low frequency control channels 21—23 and the high frequency channel 36—37, the input circuits of which are connected across the bus bars. Normally, no signals are impressed on the low frequency channel because the voltage appearing on the potentiometer arm 21 is made equal to the voltage produced by the reference source 24. However, when the voltage appearing on the potentiometer arm 21 is no longer equal to the reference voltage 24, condenser 205 will be periodically charged and discharged with the aid of chopper 25. The slow voltage variations are converted into rectangular waves or pulses, and are then impressed on the alternating current amplifier 27. The amplified signals are impressed on the mixer tube 223 through an isolation transformer 28. The second control channel, which adjusts the resistance of triode 18 in response to any fast voltage variations, begins with the isolation transformer 230 which impresses these fast voltage variations on the cathode follower 232. These fast voltage variations are then combined in the mixer tube 223 and, after additional amplification in the pentodes 235 and 236, are used for controlling the resistance of triode 18 so as to maintain the voltage across the bus bars 20—16 constant.

It should be noted that the slow, or low frequency, voltage variations include the voltage variations which may have the frequency between 0 and approximately 6 cycles per second, the upper limit to frequency response of the low frequency control channel being due to the introduction of the choppers 25 and 32 in this channel which are operated from source 26 having a frequency in the order of 50 or 60 cycles. The high frequency control channel may have the frequency response from 5 or 6 cycles per second up to 50,000 cycles per second. The direct current amplifier connected to the output of the mixer tube 223 must be a direct current amplifier in order to amplify the direct current component impressed on the grid of the mixer tube 223 by the ouput of the low frequency control channel.

High power efficiency and high current efficiency are obtainable with the disclosed power supply because only small voltages and small currents appear across the tubes in all channels. This also makes it possible to use low wattage tubes throughout the entire circuit which also includes the series tube 18. The above results are obtainable because of the use of independent power supplies for the control channels, isolation of tube 18 from the full bus voltage, and elimination of control current in tube 18. Also, the use of direct current amplification is reduced to an absolute minimum and after the low frequency channel had already amplified the slow variations in voltage to a much higher level. Therefore, whatever minor instability in the D.C. amplifier may be present, it will not affect materially the impedance of the series triode 18 because the amplitude of the signal impressed on the grid of triode 223 is too high to be affected by the minor variations in the amplification of the D.C. channel.

What is claimed as new is:

1. An adjustable and regulated high voltage power supply including a source of alternating potential, an auto-transformer connected to said source, a rectifier and a filter connected to said auto-transformer, serially connected thermionic tube and a load connected across said filter, said tube having a control grid and a cathode, a low frequency control channel having its input connected across said load, a high frequency control channel connected across said load, a direct current amplifier having input and output circuits, the input circuit of said amplifier being connected to the output circuits of said low frequency channel and also to the output circuit of said high frequency channel, the output circuit of said direct current amplifier being connected between the grid and the cathode of said thermionic tube, a first power supply for said direct current amplifier and said high frequency control channel and a second power supply for said low frequency control channel.

2. A regulated high voltage power supply comprising a source of direct current connected in series with a thermionic tube and a load, said tube having a cathode, a control grid and a cathode-grid input circuit, a low frequency control channel having its input circuit connected across said load, an alternating current pick up means connected across said load, a direct current amplifier having its input connected to the output of said control channel and the output of said pick-up means, the output of said direct current amplifier being connected across said grid-cathode circuit, a first direct current power supply for said direct current amplifier and said pick-up means, the input of said pick-up means including a transformer for isolating said pick-up means from the voltage appearing across said load, a second direct current power supply for said control channel, and a transformer on the output side of said control channel for isolating said control channel from the positive voltage side of said source.

3. The regulated high voltage power supply as defined in claim 2, in which said control channel includes a potentiometer connected across said source, said potentiometer having a potentiometer arm, a series circuit including said potentiometer arm, a source of reference potential, a resistor, an armature of a chopper-modulator, and a contact for said armature connected to the negative voltage side of said source, an alternating current amplifier coupled to said resistor, said second direct current power supply furnishing power for said alternating current amplifier, the output of said alternating current amplifier being connected to the primary of said transformer, and a demodulator chopper connected to the secondary of said transformer.

4. The regulated high voltage power as defined in claim 2, in which said alternating current control pickup means comprises a transformer having primary and secondary windings, the primary winding of said transformer being connected across said load, and a cathode follower circuit connected to the secondary of said transformer.

5. An adjustable, regulated high voltage power supply including a source of alternating current, an auto-transformer connected to said source, said auto-transformer having an auto-transformer adjustable arm, a rectifier and a filter serially connected to said auto-transformer, said filter acting as a source of direct current, a thermionic tube and a load serially connected across said source of direct current, said thermionic tube having a control grid, a cathode, and a cathode-to-grid circuit for controlling the resistance of said tube, a low frequency control channel having an input circuit, said input circuit including a potentiometer and a potentiometer arm, said potentiometer arm being mechanically coupled to said auto-transformer arm, whereby the main voltage adjustments take place at said auto-transformer and the fine voltage adjustments take place at said potentiometer arm, a high frequency control channel having an input and an output circuit, an independent power supply for each control channel, the input circuits of said channels being connected across said load, and a direct current amplifier having its input and output circuits, the input circuit of said direct current amplifier being connected to the output circuits of said channels, and the output circuit of said direct current amplifier being connected to said cathode-to-grid circuit for controlling the resistance of said tube in response to any variation of potential across said load.

6. The adjustable, regulated high voltage power supply as defined in claim 5 which includes a transformer on the output side of said low frequency channel for electrically isolating said channels from each other.

7. A regulated source of direct current, said source including a first high frequency control channel having its input connected across said source, a second low frequency control channel having its input connected across said source, a thermionic tube having a cathode, a grid and anode, the cathode-anode circuit of said tube being connected in series with said source, amplifier means having its input circuit connected to the outputs of said first and second channels and its output circuit connected to the grid-cathode circuit of said tube, a first power supply for said first channel and a second power supply for said second channel, said first and second power supplies being electrically isolated from each other.

8. A regulated source of direct current including first and second control channels having first and second input and output circuits respectively, said input circuits being electrically isolated from each other for passage of any direct current, said output circuits being electrically isolated from each other for passage of any direct current, a thermionic tube having a cathode, a grid and a plate, the cathode-anode circuit of said tube being connected in series with said source, and amplifying means between the output circuits of said first and second control channels and the cathode-grid circuit of said tube for controlling the tranconductance of said tube when said source is in operation.

9. The regulated source of direct current as defined in claim 8 in which said first control channel includes a direct current pick-up input circuit connected across said source, a reference voltage connected in series-opposition to said pick-up input circuit, first and second choppers, and an amplifier connected between said choppers, said first choppers being connected between said pick-up input circuit and said amplifier, and said second chopper being connected to the output of said amplifier, and a transformer connected to the output side of said second chopper.

10. The regulated source of direct current as defined in claim 8 in which said second control channel includes a high frequency amplifier having its input connected across said source, and said amplifying means is a direct current amplifier connected between the outputs of said first and second channels and said cathode-grid circuit.

References Cited in the file of this patent

UNITED STATES PATENTS

| | | |
|---|---|---|
| 2,462,935 | Baker | Mar. 1, 1949 |
| 2,551,407 | Alder | May 1, 1951 |
| 2,556,129 | Wellons | June 5, 1951 |
| 2,602,915 | Helterline | July 8, 1952 |
| 2,604,618 | Bixby | July 22, 1952 |
| 2,762,010 | Rose et al. | Sept. 4, 1956 |